United States Patent
Novick et al.

(10) Patent No.: US 7,342,885 B2
(45) Date of Patent: Mar. 11, 2008

(54) METHOD AND APPARATUS FOR IMPLEMENTING A BACKPRESSURE MECHANISM IN AN ASYNCHRONOUS DATA TRANSFER AND SOURCE TRAFFIC CONTROL SYSTEM

(75) Inventors: Ronald P. Novick, Orange, CT (US); Sing Ngee Yeo, Stratford, CT (US)

(73) Assignee: TranSwitch Corporation, Shelton, CT (US)

( * ) Notice: Subject to any disclaimer, the term of this patent is extended or adjusted under 35 U.S.C. 154(b) by 1089 days.

(21) Appl. No.: 10/345,046

(22) Filed: Jan. 15, 2003

(65) Prior Publication Data

US 2004/0136322 A1    Jul. 15, 2004

(51) Int. Cl.
- G06F 11/00  (2006.01)
- H04J 1/16   (2006.01)
- H04L 1/00   (2006.01)
- H04L 12/26  (2006.01)

(52) U.S. Cl. ...................... 370/235; 370/229
(58) Field of Classification Search ........... 370/235, 370/236, 438, 439, 443, 444, 229, 230, 230.1, 370/231, 232, 233, 234, 235.1
See application file for complete search history.

(56) References Cited

U.S. PATENT DOCUMENTS

| 3,982,077 A | 9/1976 | Clark et al. ............. 179/15 BV |
| 3,985,962 A | 10/1976 | Jones et al. ............ 179/15 AL |
| 4,149,144 A | 4/1979 | Diefenderfer ........... 340/147 R |
| 4,156,798 A | 5/1979 | Doelz ..................... 179/15 AL |
| 4,375,681 A | 3/1983 | Abbott et al. ................. 370/16 |
| 4,460,993 A | 7/1984 | Hampton et al. .............. 370/84 |
| 4,488,293 A | 12/1984 | Haussmann et al. .......... 370/84 |
| 4,660,169 A | 4/1987 | Norgren et al. ............. 364/900 |
| 4,685,101 A | 8/1987 | Segal et al. .................... 370/84 |
| 4,727,536 A | 2/1988 | Reeves et al. ................. 370/84 |
| 4,750,168 A | 6/1988 | Trevitt .......................... 370/85 |
| 4,763,320 A | 8/1988 | Rudolph et al. .............. 370/85 |
| 4,789,926 A | 12/1988 | Clarke ......................... 364/200 |
| 4,815,074 A | 3/1989 | Jacobsen ..................... 370/112 |
| 4,817,037 A | 3/1989 | Hoffman et al. ............ 364/200 |
| 5,084,872 A | 1/1992 | Le Cucq et al. ........... 370/94.2 |
| 5,163,048 A | 11/1992 | Heutink ..................... 370/85.6 |
| 5,172,373 A | 12/1992 | Suzuki ..................... 370/85.11 |
| 5,263,023 A | 11/1993 | Sevenhans et al. ...... 370/85.11 |
| 5,276,678 A | 1/1994 | Hendrickson et al. ........ 370/62 |
| 5,299,193 A | 3/1994 | Szczepanek ............... 370/85.1 |
| 5,452,330 A | 9/1995 | Goldstein .................... 375/257 |
| 5,572,686 A | 11/1996 | Nunziata et al. ............ 395/296 |

(Continued)

OTHER PUBLICATIONS

IEEE Std 802.3x-1997 and IEEEStd 802.3y-1997, p. 314-318.*

Primary Examiner—Edan Orgad
Assistant Examiner—Chuong Ho
(74) Attorney, Agent, or Firm—Gordon & Jacobson, PC

(57) ABSTRACT

Methods for implementing a backpressure mechanism in an asynchronous data transfer and source traffic control system include detecting when a bus user is experiencing congestion and preventing other bus users from sending cells over the bus. According to a first embodiment, if congestion is detected for two consecutive frames, the arbiter is inhibited from granting access to any bus user for one frame. According to a second embodiment, if congestion is detected during any frame, all the bus users are prevented from transmitting low priority traffic until congestion is absent for four consecutive frames. An apparatus for performing the methods is also disclosed.

8 Claims, 3 Drawing Sheets

U.S. PATENT DOCUMENTS

| | | | |
|---|---|---|---|
| 5,901,146 A * | 5/1999 | Upp | 370/389 |
| 5,907,822 A * | 5/1999 | Prieto, Jr. | 704/202 |
| 6,104,724 A | 8/2000 | Upp | 370/458 |
| 6,118,761 A * | 9/2000 | Kalkunte et al. | 370/229 |
| 6,646,985 B1 * | 11/2003 | Park et al. | 370/229 |
| 6,721,273 B1 * | 4/2004 | Lyon | 370/235 |
| 6,791,944 B1 * | 9/2004 | Demetrescu et al. | 370/235 |
| 6,859,435 B1 * | 2/2005 | Lee et al. | 370/231 |
| 6,947,380 B1 * | 9/2005 | Yip et al. | 370/230 |
| 6,980,520 B1 * | 12/2005 | Erimli | 370/236 |
| 6,981,054 B1 * | 12/2005 | Krishna | 709/235 |
| 2004/0114576 A1 * | 6/2004 | Itoh et al. | 370/352 |

* cited by examiner

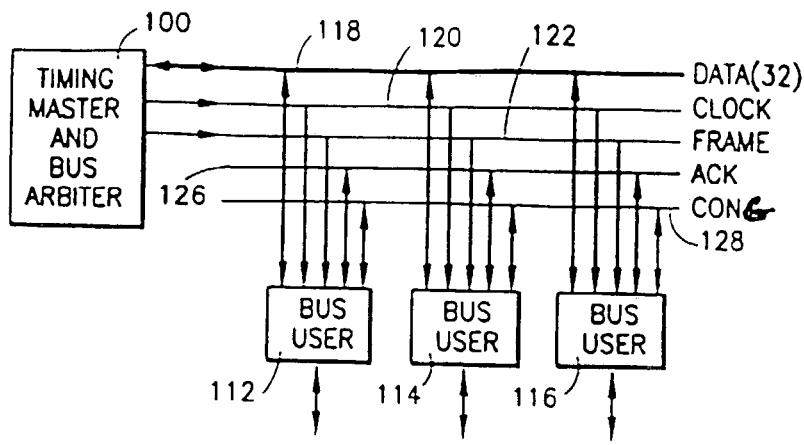

Fig. 3 Prior Art

| CLOCK CYCLE | ←-------- 32 BITS --------→ | | | |
|---|---|---|---|---|
| 0 | REQUEST FIELD | | | |
| 1 | INTERNAL ROUTING FIELD (OPTIONAL) | | | |
| 2 | A B C D VPI | | VCI | P T I C L P |
| 3 | BYTE 3 | BYTE 2 | BYTE 1 | BYTE 0 |
| 4 | BYTE 7 | BYTE 6 | BYTE 5 | BYTE 4 |
| 5 | BYTE 11 | BYTE 10 | BYTE 9 | BYTE 8 |
| 6 | BYTE 15 | BYTE 14 | BYTE 13 | BYTE 12 |
| 7 | BYTE 19 | BYTE 18 | BYTE 17 | BYTE 16 |
| 8 | BYTE 23 | BYTE 22 | BYTE 21 | BYTE 20 |
| 9 | BYTE 27 | BYTE 26 | BYTE 25 | BYTE 24 |
| 10 | BYTE 31 | BYTE 30 | BYTE 29 | BYTE 28 |
| 11 | BYTE 35 | BYTE 34 | BYTE 33 | BYTE 32 |
| 12 | BYTE 39 | BYTE 38 | BYTE 37 | BYTE 36 |
| 13 | BYTE 43 | BYTE 42 | BYTE 41 | BYTE 40 |
| 14 | BYTE 47 | BYTE 46 | BYTE 45 | BYTE 44 |
| 15 | SYSTEM CONTROL | | | G E N G R N U A N M N T |

Fig. 4 - Prior Art

METHOD AND APPARATUS FOR IMPLEMENTING A BACKPRESSURE MECHANISM IN AN ASYNCHRONOUS DATA TRANSFER AND SOURCE TRAFFIC CONTROL SYSTEM

This application is related to co-owned U.S. Pat. Nos. 5,901,146 and 6,104,724, the complete disclosures of which are hereby incorporated by reference herein.

BACKGROUND OF THE INVENTION

1. Field of the Invention

The invention relates to asynchronous data communication among a bus master and a plurality of bus users. More particularly, this invention relates to a bus frame and bus structure for an asynchronous data transfer system which allows a bus user to assert a congestion signal (CONG) to indicate a congestion condition and which places certain limits on data transfer when a CONG signal is detected.

2. State of the Art

The CELLBUS® backplane is an asynchronous data transfer and source traffic control system which has been very successful in the field of telecommunications. In particular, the CELLBUS® backplane is very useful as an alternative to a standard switch fabric in an ATM switch. As shown in prior art FIG. 3, the CELLBUS® asynchronous data transfer system includes a timing master and bus arbiter 100 and a plurality of users 112, 114, 116 which are coupled to a bidirectional data bus 118, a clock bus 120, and a frame bus 122. The users 112, 114, 116 are also coupled to a bidirectional acknowledge (ACK) bus 126, and a bidirectional congestion (CONG) bus 128. The clock bus 120 provides a system clock to each bus user and the frame bus 122 provides a frame clock to each bus user. The system clock is the basic transfer clock of the system (i.e., data is put onto the data bus and taken off the data bus during one system clock cycle), whereas the frame clock designates the start of a frame.

Prior art FIG. 4 illustrates the frame format which preferably includes sixteen system clock cycles, a first one of which is designated the request field and a last one of which includes a grant field. One or more other cycles may be assigned control and/or routing information and the remainder of the cycles are assigned to the transfer of data from one particular user onto the bus and off the bus to one or more other users. During the first cycle of each bus frame, a number of bus users may request access, which requests are received by the bus master during the same first cycle. During the last cycle of each bus frame, the bus master grants access to a selected bus user for the entire data portion of the next frame. Bus users are thus regularly (once each cell) allowed to request access for the next frame and the bus master is regularly (once each frame) granting access to a selected bus user. Which user is granted access to the next frame is determined according to an arbitration method in the bus master which is unknown to the bus users. The arbitration method may thus be changed at any time by the bus master without informing the bus users. Thus, for example, as traffic conditions on the bus change (as different users request more or less access) the arbitration method can be adjusted accordingly by the bus master to provide the most efficient allocation of bus access.

In the CELLBUS® system thus described, ATM cells may be transferred from any bus user to any other bus user, or to any number of other bus users (multicast). One user at a time sends a cell to the bus, which may be read from the bus by any user or users. The bus timing master sources the system transfer clock and bus framing signal, both of which are used to synchronize all bus access operations. Bus access is controlled by the bus arbiter. Users request bus access from the bus arbiter. Each bus user is assigned two bits of the request field. Thus, sixteen users are supported in one implementation of a CELLBUS® system. The use of two bits for a request allows the requests to be prioritized in three levels. Another implemention of a CELLBUS® system allows up to thirty-two users. In order to preserve the two-bit request format, each user may only make a request every other frame, e.g. every even frame or every odd frame. The bus arbiter accepts access requests, queues them as needed, and issues grants. When a grant is issued, it is for one user to send one cell to the bus. All grants are for a single cell time on the bus only. When a user is granted access by the bus arbiter, it will indicate acceptance by asserting the ACK line during the grant phase of the same frame in which the cell was sent. Local conditions at the addressed terminal, such as congestion, may cause an ACK not to be generated. The sending bus user may detect a congested indication at the destination by sensing an asserted CONG signal on the CONG line during the grant phase of the same frame in which the cell was sent. The timing of the CONG signal is identical to that of the ACK signal, during the grant phase of the same frame in which the cell was sent. An active CONG is an indication of congestion. An inactive CONG indicates no indication. The definition of what condition defines congestion and the consequential actions of an active CONG indication are unspecified in the CELLBUS® specification. Preferably, however, a CONG signal is sent before the bus user is incapable of accepting any more data.

SUMMARY OF THE INVENTION

It is therefore an object of the invention to provide a logical method for implementing congestion control in an asynchronous data transfer and source traffic control system.

It is another object of the invention to provide a logical method which uses a congestion signal to implement congestion control in an asynchronous data transfer and source traffic control system.

It is also an object of the invention to provide a logical method for implementing congestion control in a CELL-BUS® system.

It is still another object of the invention to provide a logical method which uses the CELLBUS® CONG signal to implement congestion control.

In accord with these objects which will be discussed in detail below, according to a first embodiment of the invention, the bus arbiter is programmed to detect when a bus user is experiencing congestion and to prevent other bus users from sending cells to the congested user. In particular, if congestion is detected for two consecutive frames, the arbiter is inhibited from granting access to any bus user for one frame.

The first embodiment guarantees that the congested bus user will not receive a cell for at least one out of every three frames. This will absolutely help relieve congestion at the egress FIFO which will result in lower cell loss across the bus. The traffic is backpressured to the ingress devices which must now absorb more traffic. This, however, is desirable because the ingress buffers are often much larger than the CELLBUS® rate decoupling buffers. A potential disadvantage of this approach is that it may result in slightly longer transport delays for high priority traffic during times when no bus user is permitted to use the bus.

A second embodiment of congestion control according to the invention results in fewer transport delays for high priority traffic. According to the second embodiment, if congestion is detected during any frame, all the bus users are prevented from transmitting low priority traffic until congestion is absent for four consecutive frames. This method does not absolutely guarantee that congestion will be relieved, particularly if the traffic on the bus is predominantly high priority traffic. However, in most applications, the volume of high priority traffic is relatively low compared to the volume of low priority traffic. Thus, in most applications, the second embodiment will succeed in reducing congestion without delaying the high priority traffic. The second embodiment can be implemented in two ways. According to the first way, each bus user is programmed such that its scheduler ignores low priority traffic during the period of congestion. According to the second way, the bus arbiter decides, based on the priority indicated by the two-bit request, which requests are high priority and declines grants to low priority requests during periods of congestion.

Additional objects and advantages of the invention will become apparent to those skilled in the art upon reference to the detailed description taken in conjunction with the provided figures.

BRIEF DESCRIPTION OF THE DRAWINGS

FIG. 3 is a simplified block diagram of a prior art CELLBUS® system; and

FIG. 4 is a diagram of the frame used in the CELLBUS® system.

DETAILED DESCRIPTION OF THE PREFERRED EMBODIMENTS

Figure 1:
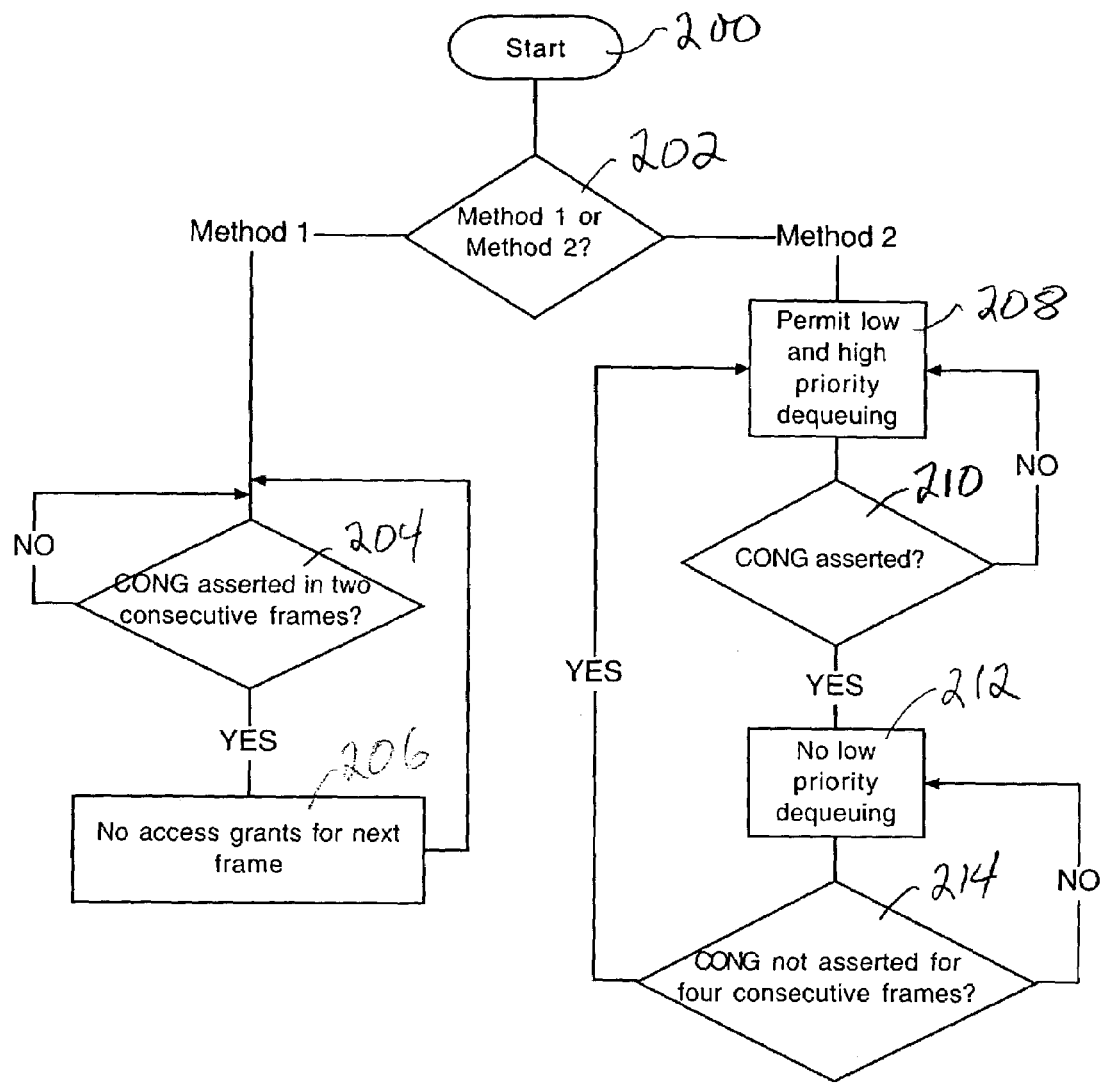
FIG. 1 is a simplified flow chart illustrating the methods of the invention.

Referring now to FIG. 1, the two embodiments of methods according to the invention are illustrated in a single flow chart. Starting at 200, it is determined at 202 which method will be used. Continuing on the left side of the chart, the first method determines at 204 whether congestion exists. If congestion exists, i.e. CONG is asserted by a bus user experiencing egress congestion, no access is granted by the bus master to the next frame as indicated at 206. When there is no congestion, access is granted as usual.

Turning to the right side of FIG. 1, the second method begins by permitting both low and high priority dequeuing at 208. If it is determined at 210 that congestion exists, i.e. CONG is asserted by any user, all bus users are prevented at 212 from transmitting low priority traffic. The ban on low priority traffic remains in effect until it is determined at 214 that congestion has been absent for four consecutive frames. If congestion is absent for four consecutive frames, bus access returns to normal.

The illustration of both methods in FIG. 1 implies that both methods be available for application at any time. However, it is within the scope of the invention to implement only one of the methods. In addition, the use of the terms "CONG" and "frame" imply that the methods are implemented in conjunction with a CELLBUS® system. However, the first method can be used in any system employing a repeating frame and where congestion can be detected. The second method can be used in any system having mixed high priority and low priority traffic which employs a repeating frame and where congestion can be detected.

Figure 2:
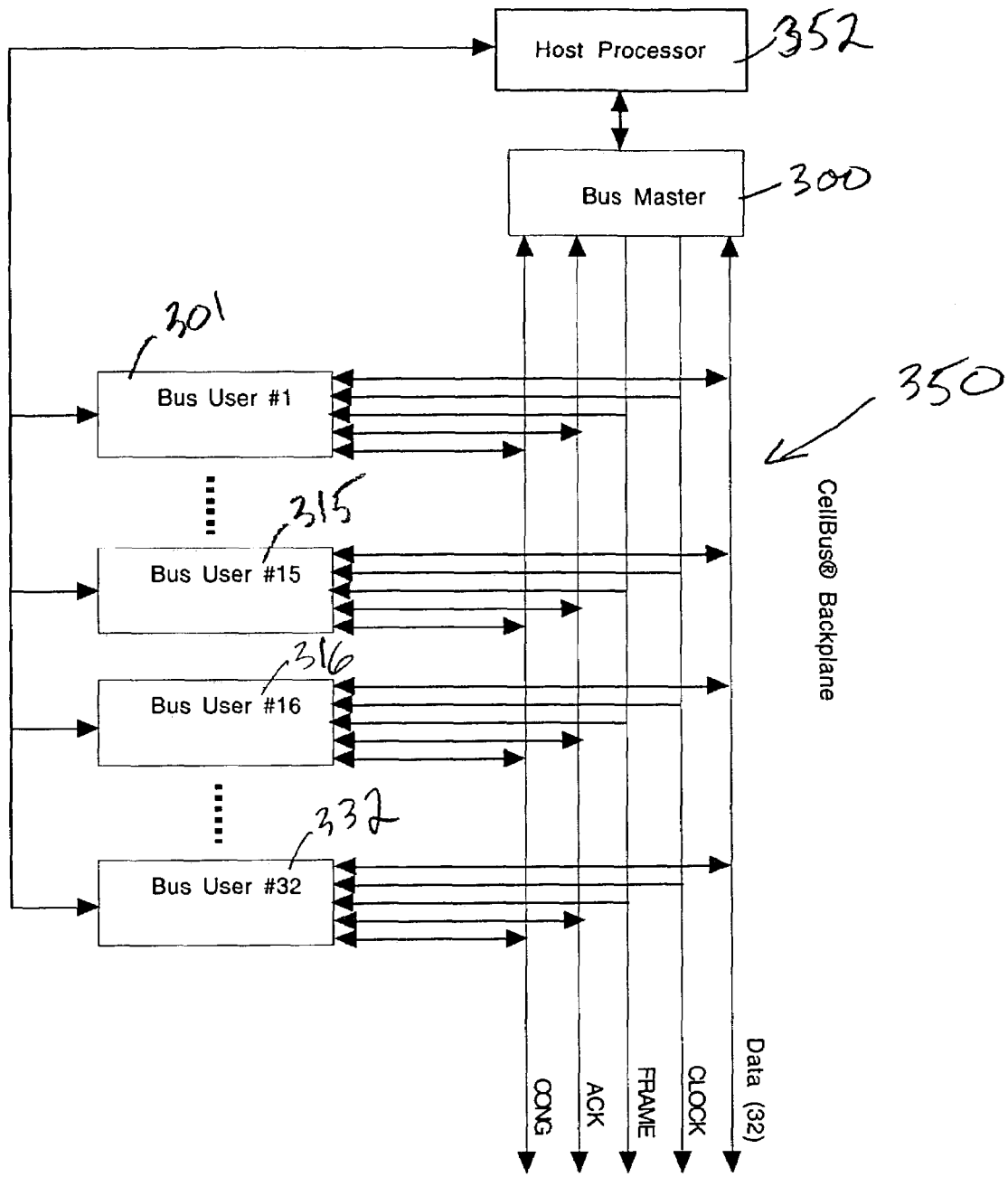
FIG. 2 is a simplified block diagram illustrating an apparatus according to the invention.

The presently preferred embodiment of the invention is implemented in a CELLBUS® system which is illustrated in FIG. 2. The system includes a bus master 300 and up to thirty-two bus users 301-332 coupled to a CELLBUS® backplane 350. According to the presently preferred embodiment, any bus user may be configured to be the bus master. The bus master and the bus users are preferably coupled to a host processor 352. The host processor is used to configure the bus users and the bus master to carry out the methods of the invention described above with reference to FIG. 1.

The present invention may be implemented with virtually any CELLBUS® compatible device. An exemplary device is the ASPEN® EXPRESS™ device produced by Tran-Switch Corporation, Shelton, Conn. The ASPEN® EXPRESS™ device has a configurable shared buffer space for 512K ATM cells. Thus it is well equipped to tolerate backpressure imposed by the methods of the invention.

The first embodiment can be implemented entirely in the bus arbiter. The second embodiment can be implemented in two ways. According to the first way, each bus user is programmed such that its scheduler ignores low priority traffic during the period of congestion. According to the second way, which can be implemented entirely in the bus arbiter, the bus arbiter decides which requests are high priority based on the two-bit request, and declines grants to low priority requests during periods of congestion.

There have been described and illustrated herein methods and apparatus for implementing a backpressure mechanism in an asynchronous data transfer and source traffic control system. While particular embodiments of the invention have been described, it is not intended that the invention be limited thereto, as it is intended that the invention be as broad in scope as the art will allow and that the specification be read likewise. For example, while the number of congested frames in the first embodiment is stated to be two, the congestion threshold could be higher or lower depending on expected traffic conditions. Similarly, the four frame decongestion threshold in the second embodiment could be adjusted for similar reasons. It will therefore be appreciated by those skilled in the art that yet other modifications could be made to the provided invention without deviating from its spirit and scope as so claimed.

The invention claimed is:

1. A method for implementing a backpressure mechanism in an asynchronous data transfer and source traffic control system having a data bus and a plurality of bus users where data is transferred over the bus in a repeating frame, some data is high priority and other data is low priority, said method comprising:
 a) detecting a congestion condition;
 b) barring low priority data access to the bus following the detection of a congestion condition; and
 c) permitting low priority traffic following four consecutive frames during which no congestion is detected.

2. The method according to claim 1, wherein:
 the bus includes a CONG signal for indicating congestion, and
 said step of detecting a congested condition includes detecting when the CONG signal is asserted.

3. The method according to claim 2, wherein:
 the system includes a bus master,
 the bus users request access to the bus at the beginning of the frame, and the bus master grants access at the end of the frame.

4. The method according to claim 3, wherein:
the CONG signal is asserted during the last clock cycle of the repeating frame.

5. An apparatus for implementing a backpressure mechanism in an asynchronous data transfer and source traffic control system having a data bus and a plurality of bus users where data is transferred over the bus in a repeating frame, some data is high priority and other data is low priority, said method comprising:
  a) detection means for detecting a congestion condition; and
  b) access control means barring low priority data access to the bus following the detection of a congestion condition, wherein
    said access control means removes the bar to low priority traffic following four consecutive frames during which no congestion is detected by the detection means.

6. The apparatus according to claim 5, wherein:
the bus includes a CONG signal for indicating congestion, and
said detection means detects a congested condition when the CONG signal is asserted.

7. The apparatus according to claim 6, wherein:
the system includes a bus master coupled to the bus,
the bus users request access to the bus at the beginning of the frame, and
the bus master grants access at the end of the frame.

8. The apparatus according to claim 7, wherein:
the CONG signal is asserted during the last clock cycle of the repeating frame.

* * * * *